United States Patent
Lin

(10) Patent No.: US 9,482,873 B2
(45) Date of Patent: Nov. 1, 2016

(54) 2D AND 3D IMAGE SWITCHABLE DISPLAY DEVICE AND LENTICULAR LENS ELEMENT

(71) Applicant: Zhangjiagang Kangde Xin Optronics Material Co., Ltd., Zhangjiagang, Jiangsu Province (CN)

(72) Inventor: Mingyan Lin, Zhangjiagang (CN)

(73) Assignee: Zhangjiagang Kangde Xin Optronics Material Co., Ltd. (CN)

( * ) Notice: Subject to any disclaimer, the term of this patent is extended or adjusted under 35 U.S.C. 154(b) by 136 days.

(21) Appl. No.: 14/569,113

(22) Filed: Dec. 12, 2014

(65) Prior Publication Data

US 2016/0011427 A1    Jan. 14, 2016

(30) Foreign Application Priority Data

Jul. 11, 2014    (CN) .......................... 2014 1 0332212

(51) Int. Cl.
    *G02F 1/1334*    (2006.01)
    *G02B 27/22*    (2006.01)
    *G02F 1/29*    (2006.01)

(52) U.S. Cl.
    CPC ......... *G02B 27/2214* (2013.01); *G02F 1/1334* (2013.01); *G02F 1/29* (2013.01)

(58) Field of Classification Search
    CPC .................................................. G02F 1/13306
    See application file for complete search history.

(56) References Cited

U.S. PATENT DOCUMENTS

| 4,783,280 A * | 11/1988 | Petrzilka ................ C09K 19/42 252/299.01 |
| 4,944,576 A * | 7/1990 | Lacker ................. C09K 19/544 349/170 |
| 5,621,552 A * | 4/1997 | Coates ................. C09K 19/544 349/86 |
| 2012/0194399 A1* | 8/2012 | Bily ...................... H01Q 13/28 343/772 |
| 2014/0049682 A1* | 2/2014 | Galstian .................... G02B 7/38 348/356 |
| 2014/0131444 A1* | 5/2014 | Wang ................. G06K 7/10831 235/454 |
| 2015/0109763 A1* | 4/2015 | Shinkai ................. G02F 1/1334 362/97.2 |
| 2015/0131039 A1* | 5/2015 | Wang ..................... C09K 19/22 349/106 |

\* cited by examiner

*Primary Examiner* — Timothy L Rude
(74) *Attorney, Agent, or Firm* — McAndrews, Held & Malloy, Ltd.

(57) ABSTRACT

The display device includes an image display the screen of which includes a plurality of sub-pixels of three primary colors R, G and B for displaying a 2D image and a 3D image; and a DFD-PDLC lenticular lens array which includes a plurality of parallel DFD-PDLC lenticular lens elements, wherein the direction of the long axis of each of the DFD-PDLC lenticular lens elements is vertical or slant to the screen of an image display, the DFD-PDLC lenticular lens array is installed in front of the screen of the image display, the optical refractive index of the DFD-PDLC lenticular lens elements is variated under the drive of an external drive voltage V(f) to switch between the display of a 2D image and the display of a 3D image on the screen of the image display, wherein f is the drive frequency of the external drive voltage.

24 Claims, 8 Drawing Sheets

$n_P = n_\parallel$ $$n_{eff} = n_\parallel = n_P$$

3D Mode $$n_{eff} = n_\perp < n_P$$

$n_P = n_\perp$

2D Mode $n_{eff} = n_\perp = n_P$

2D AND 3D IMAGE SWITCHABLE DISPLAY DEVICE AND LENTICULAR LENS ELEMENT

CROSS-REFERENCE TO RELATED APPLICATIONS/INCORPORATION BY REFERENCE

This application claims priority to Chinese patent application No. 201410332212.X, filed Jul. 11, 2014, entitled "2D and 3D image switchable display device and lenticular lens element". The above-identified application is hereby incorporated herein by reference in its entirety.

TECHNICAL FIELD OF THE INVENTION

The present invention relates to the field of autostereoscopic 3D image display technologies and more particularly to a 2D and 3D image switchable display device and a dual-frequency driven polymer dispersed liquid crystal (DFD-PDLC) lenticular lens element.

BACKGROUND OF THE INVENTION

As shown in FIG. 1 which a schematic diagram showing a well-known 2D and 3D image switchable display device, a well-known 2D and 3D image switchable display device 10 generally uses a liquid crystal view separator 12 installed in front of the screen of a liquid crystal display 11. For the watching position of a viewer 13, the installation of the liquid crystal view separator 12 in front of the screen of the liquid crystal display 11 is hereinafter referred to as a front installation method.

Further, under the drive of a proper external electrical voltage V, the liquid crystal view separator 12 presents a light transparent state to realize the display of a 2D image or presents a view separated state to realize the display of a 3D image.

Generally, the liquid crystal view separator 12 consists of a liquid crystal lenticular device or a liquid crystal parallax barrier device. As the related technology disclosed herein belongs to the field of liquid crystal lenticular devices, only well-known technologies are described hereinafter aiming at well-known liquid crystal lenticular devices. The methods that have been proposed regarding the foregoing liquid crystal lenticular device are mainly classified into a surface relief method, a polarization activated method and a patterned-electrode method.

FIG. 2 is a schematic diagram showing the components of a surface relief based liquid crystal lenticular device. The structure shown in FIG. 2 is disclosed in U.S. Pat. No. 6,069,650 and may be understood by reference to accompanying drawing FIG. 3.

The surface relief based liquid crystal lenticular device 50 consists of, from the top down, an upper transparent substrate 51, an upper ITO electrode 52, a plano-concave lens array 53, a plurality of liquid crystal molecules 54, a lower ITO electrode 55 and a lower transparent substrate 56. The plano-concave lens array 53 has an optical reflective index $n_P$; the plurality of liquid crystal molecules 54 made from a nematic liquid crystal material and having characteristics of birefringent optics has an ordinary refractive index $n_o$ and an extraordinary refractive index $n_e$, wherein $n_o = n_P$ and $n_e > n_P$. The upper and the lower ITO electrode layers 52 and 55 are individually configured by alignment layers, a well-known component disposed in liquid crystal devices, and connected with a power supply V.

Further, the liquid crystal lenticular device 50 is installed in front of a liquid crystal screen 60 which is capable of displaying a 2D or 3D image (not shown) on the color filter (CF) 61 thereof, the light source of the 2D or 3D image, after being processed by the outmost polarizer 62 of the liquid crystal screen 60, becomes a linear polarized light source 63 having the polarization direction which is vertical to the surface of accompanying drawing FIG. 2.

In the absence of an external electric field, that is, when V=OFF, the orientation of the nematic liquid crystal molecules is featured in that the optical axis of the nematic liquid crystal molecules is vertically aligned to the surface of accompanying drawing FIG. 2. The extraordinary optical reflective index $n_e$ of the liquid crystal molecule is effective when the incident light 63, having a light polarization direction being parallel to the optical axis of the liquid crystal molecule, penetrates the plurality of liquid crystal molecules 54. Further, when the incident light 63 penetrates the plano-concave lens array 53, as $n_e > n_P$, the incident light 63 subjects to the effect of a convex lens, consequentially, the foregoing optical characteristic is suitable for presenting a 3D image.

Additionally, in the presence of an external electric field, that is, when V=ON, the orientation of the nematic liquid crystal molecules is featured in that the optical axis of the nematic liquid crystal molecules lies flatly on the surface of accompanying drawing FIG. 2 and is vertically aligned to the upper and the lower ITO electrode layers 52 and 55, that is, parallel to the direction of the electric field (not shown). The ordinary optical reflective index $n_o$ of the liquid crystal molecule is effective when the incident light 63, having a light polarization direction being vertical to the optical axis of the liquid crystal molecule, penetrates the plurality of liquid crystal molecules 54. Further, when the incident light 63 penetrates the plano-concave lens array 53, as $n_o = n_P$, the incident light 63 directly penetrates the plano-concave lens array 53 without being deflected by the plano-concave lens array 53, therefore, the foregoing optical characteristic is suitable for presenting a 2D image.

To sum up, the orientation of the liquid crystal molecules of the liquid crystal lenticular device 50 featured in an electric field modulated refractive index is aligned under the control of an external voltage to change the reflective index of the liquid crystal molecules, so as to provide an effect of light penetration or an effect of a lens for linear polarized incident light, so as to finally achieve the purpose of switching between the display of 2D image and 3D image.

FIG. 3 is a schematic diagram showing the components of a polarization activation based liquid crystal lenticular device. The structure shown in FIG. 3 is disclosed in U.S. Pat. No. 7,058,252 B2 and may be understood by reference to accompanying drawing FIG. 32a. Further, a more detailed description and drawings may be obtained by reference to the description on accompanying drawing FIG. 6 of U.S. Pat. No. 8,279,363 B2.

The polarization activation based liquid crystal lenticular device 190 consists of an electrode substrate component 180, two transparent electrodes 178, a 90-degree rotatable polarizing component 176, a microlens counter substrate 142, a birefringent microlenses 138, an isotropic material 134 and a lens substrate component 132. Further, the other structure shown in FIG. 3 is a well-known liquid crystal display 200 consisting of a backlight source 60, a polarizing component 64, an LCD substrate 66, an LCD pixel component 67, an LCD substrate 80 and a polarizing component 184.

The two transparent electrodes 178 individually installed on the electrode substrate component 180 and the microlens counter substrate 142 constitute an electrically switchable polarizer 191 with the 90-degree rotatable polarizing component 176; and by driving the two transparent electrodes 178 using a proper external voltage (not shown), the 90-degree rotatable polarizing component 176 may rotate the polarization direction of the linear polarized incident light by 90 degrees or maintains the polarization direction of the linear polarized incident light. Further, the birefringent lens 138, which is a structure provided with a liquid crystal lenticular device, is made from a birefringent material having an ordinary refractive index $n_o$ and an extraordinary refractive index $n_e$, wherein the ordinary refractive index $n_o$ is equal to the optical refractive index $n_1$ of the isotropic material 134, that is, $n_1=n_o$.

When a 2D image is displayed, the image light source (not shown) output from the polarizing component 184 has characteristics of linearly polarized light and enters the electrically switchable polarizer 191 which, for the incident light, maintains the polarization direction of the incident light so that the polarization direction of the incident light is vertical to the direction of the optical axis of the birefringent lens 138, thus, the incident light penetrates the birefringent lens 138 having an ordinary optical reflective index $n_o$. As the optical refractive index $n_1$ of the isotropic material 134 is equal to $n_o$, the birefringent lens 138 loses its efficacy as a lens.

When a 3D image is displayed, the image light source (not shown) output from the polarizing component 184 has characteristics of linearly polarized light and enters the electrically switchable polarizer 191 which, for the incident light, rotates the polarization direction of the incident light by 90 degrees so that the polarization direction of the incident light is parallel to the direction of the optical axis of the birefringent lens 138, thus, the incident light penetrates the birefringent lens 138 having an extraordinary optical reflective index $n_e$. As the optical refractive index $n_1$ of the isotropic material 134 is not equal to $n_e$, the birefringent lens 138 has the function of a lens.

FIG. 4 is a schematic diagram showing the components of a patterned-electrode based liquid crystal lenticular device. The structure shown in FIG. 4 is disclosed in U.S. Pat. No. 8,330,881 B2 and may be understood by reference to accompanying drawing FIG. 12a.

The patterned-electrode based liquid crystal lenticular device 100 consists of a liquid crystal material 90, an ITO lens electrode layer 92, an ITO common electrode layer 94 and two glass substrates 96 and 98.

The ITO lens electrode layer 92 which consists of a plurality of single electrodes of a proper width that are spaced from each other by a proper distance is connected with an external electronic circuit (not shown) capable of providing all the single electrodes with a proper periodically distributed drive voltage to generate a periodically distributed quadratic electric field, so as to arrange the liquid crystal molecules of the liquid crystal material 90 into a plurality of gradient index lenses (GRIN Lens) gradually changed in optical reflective index.

That is, the external electronic circuit provides a suitable voltage for the pair of single electrodes 99 shown in FIG. 4 and the electrodes located between the pair of the single electrodes 99 to generate the foregoing quadratic electric field distribution for gradually reversing the alignment direction of the liquid crystal molecules between the two electrodes 99 into a 180 degree to finally form a gradient index structure. In this way, the patterned-electrode based liquid crystal lenticular device 100 has the function of a lens and realizes the purpose of presenting a 3D image.

Further, in the case of the display of a 2D image, the external electric circuit is disabled in voltage supply so that all the liquid crystal molecules are arranged in the same vertical direction to form a transparent element not having the function of a lens. Further, the ITO common electrode layer 94 consisting of continuously distributed electrodes is also connected with the external electronic circuit to form an electrical common layer.

In conclusion, the feature of three kinds of liquid crystal lenticular devices is to use liquid crystal molecules, so as to achieve the modulation of optical index. Thus, the foregoing three well-known technologies are classified into the technical field of liquid crystal dependent liquid crystal lenticular devices.

SUMMARY OF THE INVENTION

The present invention aims to provide a 2D and 3D image switchable display device and a DFD-PDLC lenticular lens element for solving the problem related to the complicated structure of currently existing 2D and 3D image switchable display device.

To address the technical problem above, in accordance with an aspect of the present invention, a 2D and 3D image switchable display device is provided, including: an image display the screen of which includes a plurality of sub-pixels of three primary colors R, G and B for displaying a 2D image and a 3D image; and a DFD-PDLC lenticular lens array which includes a plurality of parallel DFD-PDLC lenticular lens elements, wherein the direction of the long axis of each lenticular lens element is vertical or slant to the screen of the image display, the DFD-PDLC lenticular lens array is installed in front of the screen of the image display, and the optical refractive index of the DFD-PDLC lenticular lens elements is variated under the drive of an external drive voltage V(f) to switch between the display of a 2D image and the display of a 3D image on the screen of the image display, wherein f is the drive frequency of the external drive voltage.

Further, the image display is selected from a liquid crystal display, a plasma display, an OLED display and an LED display, and the configuration of the sub-pixels of the screen of the image display is selected from: a vertical strip configuration, a mosaic configuration, a delta configuration and a pentile configuration.

Further, each DFD-PDLC lenticular lens element includes, from the top down, an upper transparent substrate, an upper ITO electrode layer, a plano-convex polymer lens, a plano-concave PDLC lens, a lower ITO electrode layer and a lower transparent substrate.

Further, the material of the upper transparent substrate and the lower transparent substrate is transparent glass or PET material.

Further, the upper ITO electrode layer and the lower ITO electrode layer are transparent electrode layers installed on internal sides of corresponding transparent substrates and connected with the external drive voltage V(f) to generate an electric field by means of the external drive voltage V(f).

Further, the plano-convex polymer lens made from polymer material has an optical refractive index $n_P$, wherein the convex surface of the plano-convex polymer lens is an arc surface, and the optical structure of the plano-convex polymer lens is formed through a mould stamping shaping process and a UV-cured roll-to-roll manufacturing process.

Further, the plano-concave PDLC lens consists of a plurality of liquid crystal droplets and polymer material, wherein the polymer material has an optical refractive index $n_P$ and the plurality of liquid crystal droplets are uniformly distributed inside the polymer material, and the plurality of liquid crystal droplets and the polymer material are filled inside the plano-concave PDLC lens through a coating process.

Further, the size of the liquid crystal droplet is greater than wavelengths of visible lights.

Further, the size of the liquid crystal droplet is smaller than wavelengths of visible lights.

Further, the liquid crystal droplet consists of a plurality of rod-shaped liquid crystal molecules the ordinary refractive index of which is $n_\perp$, the extraordinary refractive index of which is $n_{//}$, the long axis dielectric constant of which is $\epsilon_{//}$, and the short axis dielectric constant of which is $\epsilon_\perp L$, wherein $n_\perp$ and $n_{//}$ meet the following relationship: $n_{//}>n_\perp$, $n_{//}$ and $n_P$ meet the following relationship: $n_{//}=n_P$, and $\epsilon_{//}$ and $\epsilon_\perp$ meet the following relationships:

$\Delta\epsilon>0$ when $f=f_L<f_c$, $\Delta\epsilon<0$ when $f=f_H>f_c$, and $\Delta\epsilon=0$ when $f=f_c$, wherein f is the drive frequency of the external drive voltage V(f), $f_L$ is a homeotropic alignment frequency, $f_H$ is a homogeneous alignment frequency, $f_c$ is a cross-over frequency, and $\Delta\epsilon=\epsilon_{//}-\epsilon_\perp$;

when $f=f_L<f_c$, that is, when $\Delta\epsilon>0$, the electric field generated by the external drive voltage rotates the orientation of the liquid crystal molecules so that long axes of the liquid crystal molecules are aligned along the direction of the electric field; when $f=f_H>f_c$, that is, when $\Delta\epsilon<0$, the electric field generated by the external drive voltage aligns short axes of the liquid crystal molecules along the direction of the electric field; and when $f=f_c$, that is, when $\Delta\epsilon=0$, the electric field generated by the external drive voltage loses the function of rotating the liquid crystal molecules.

Further, for the homogeneous alignment frequency $f_H$, when the external drive voltage $V(f=f_H)$ with a preset amplitude drives the liquid crystal molecules at a frequency f equal to $f_H$, long axes of the liquid crystal molecules are aligned along a Z-axis direction; for incident light polarized in the Z-axis direction, the effective optical refractive index of the liquid crystal molecules in the crystal liquid droplet meets the following relationship: $n_{eff}=n_{//}=n_P$, and the DFD-PDLC lenticular lens element presents a light penetrated characteristic.

Further, for the homeotropic alignment frequency $f_L$, when the external drive voltage $V(f=f_L)$ with a preset amplitude drives the liquid crystal molecules at a frequency f equal to $f_L$, long axes of the liquid crystal molecules are aligned along a Y-axis direction; for incident light polarized in the Z-axis direction, the effective optical refractive index of the liquid crystal molecules in the crystal liquid droplet meets the following relationship: $n_{eff}=n_\perp<n_P$, and the DFD-PDLC lenticular lens element presents the characteristics of a lens.

Further, each of the DFD-PDLC lenticular lens elements includes, from the top down, an upper transparent substrate, an upper ITO electrode layer, a plano-concave polymer lens, a plano-convex PDLC lens, a lower ITO electrode layer, and a lower transparent substrate.

Further, the material of the upper transparent substrate and the lower transparent substrate is transparent glass or PET material.

Further, the upper ITO electrode layer and the lower ITO electrode layer are transparent electrode layers installed on internal lateral sides of corresponding transparent substrates and connected with the external drive voltage V(f) to generate an electric field by means of the external drive voltage V(f).

Further, the plano-concave polymer lens made from polymer material has an optical reflective index $n_P$, the concave surface of the plano-concave polymer lens is an arc surface, and the optical structure of the plano-concave polymer lens is formed through a mould stamping shaping process and a UV-cured roll-to-roll manufacturing process.

Further, plano-convex PDLC lens consisting of a plurality of liquid crystal droplets and a polymer material has an optical refractive index $n_P$, wherein the plurality of liquid crystal droplets are uniformly distributed inside the polymer material, and the plurality of liquid crystal droplets and the polymer material are filled inside the plano-convex PDLC lens through a coating process.

Further, the size of the liquid crystal droplet is greater than wavelengths of visible lights.

Further, the size of the liquid crystal droplet is smaller than wavelengths of visible lights.

Further, the liquid crystal droplet consists of a plurality of rod-shaped liquid crystal molecules the ordinary refractive index of which is $n_\perp$, the extraordinary refractive index of which is $n_{//}$, the long axis dielectric constant of which is $\epsilon_{//}$, and the short axis dielectric constant of which is $\epsilon_\perp$, wherein $n_\perp$ and $_{//}$ meet the following relationship: $n_{//}>n_\perp$, $n_\perp$ and $n_P$ meet the following relationship: $n_\perp=n_P$, and $\epsilon_{//}$ and $\epsilon_\perp$ meet the following relationships:

$\Delta\epsilon>0$ when $f=f_L<f_c$, $\Delta\epsilon<0$ when $f=f_H>f_c$, and $\Delta\epsilon=0$ when $f=f_c$, wherein f is the drive frequency of the external drive voltage V(f), $f_L$ is a homeotropic alignment frequency, $f_H$ is a homogeneous alignment frequency, $f_c$ is a cross-over frequency, and $\Delta\epsilon=\epsilon_{//}-\epsilon_\perp$.

when $f=f_L<f_c$, that is, when $\Delta\epsilon>0$, the electric field generated by the external drive voltage is capable of rotating the orientation of the liquid crystal molecules so that long axes of the liquid crystal molecules are aligned along the direction of the electric field; when $f=f_H>f_c$, that is, when $\Delta\epsilon<0$, the electric field generated by the external drive voltage aligns short axes of the liquid crystal molecules along the direction of the electric field; and when $f=f_c$, that is, when $\Delta\epsilon=0$, the electric field generated by the external drive voltage loses the function of rotating the liquid crystal molecule.

Further, for the homeotropic alignment frequency $f_L$, when the external drive voltage $V(f=f_L)$ with a preset amplitude drives the liquid crystal molecules at a frequency f equal to $f_L$, long axes of the liquid crystal molecules are aligned along a Y-axis direction; for incident light polarized in the Z-axis direction, the effective optical refractive index of the liquid crystal molecule in the crystal liquid droplet meets the following relationship: $n_{eff}=n_\perp=n_P$, and the DFD-PDLC lenticular lens element presents a light penetrated characteristic.

Further, for the homogeneous alignment frequency $f_H$, when the external drive voltage $V(f=f_H)$ with a preset amplitude drives the liquid crystal molecules at a frequency f equal to $f_H$, long axes of the liquid crystal molecules are aligned along a Z-axis direction; for incident light polarized in the Z-axis direction, the effective optical refractive index of the liquid crystal molecule in the crystal liquid droplet meets the following relationship: $n_{eff}=n_{//}>n_P$, and the DFD-PDLC lenticular lens element presents the characteristics of a lens.

Further, the image display is a field-sequential-color liquid crystal display.

In accordance with another aspect of the present invention, a DFD-PDLC lenticular lens element is provided, including: from the top down, an upper transparent substrate, an upper ITO electrode layer, a plano-convex polymer lens, a plano-concave PDLC lens, a lower ITO electrode layer and a lower transparent substrate, wherein the optical refractive index of the DFD-PDLC lenticular lens element is variated under the drive of an external drive voltage V(f), wherein f is the drive frequency of the external drive voltage.

Further, the material of the upper transparent substrate and the lower transparent substrate is transparent glass or PET material.

Further, the upper ITO electrode layer and the lower ITO electrode layer are transparent electrode layers installed on internal sides of corresponding transparent substrates and connected with the external drive voltage V(f) to generate an electric field by means of the external drive voltage V(f).

Further, the plano-convex polymer lens made from polymer material has n optical refractive index $n_P$, wherein the convex surface of the plano-convex polymer lens is an arc surface, and the optical structure of the plano-convex polymer lens is formed through a mould stamping shaping and a UV-cured roll-to-roll manufacturing process.

Further, the plano-concave PDLC lens consisting of a plurality of liquid crystal droplets and polymer material, wherein the polymer material has an optical refractive index $n_p$ and the plurality of liquid crystal droplets are uniformly distributed inside the polymer material, and the plurality of liquid crystal droplets and the polymer material are filled inside the plano-concave PDLC lens through a coating process.

Further, the size of the liquid crystal droplet is greater than wavelengths of visible lights.

Further, the size of the liquid crystal droplet is smaller than wavelengths of visible lights.

Further, the liquid crystal droplet consists of a plurality of rod-shaped liquid crystal molecules the ordinary refractive index of which is $n_\perp$, the extraordinary refractive index of which is $n_{//}$, the long axis dielectric constant of which is $\epsilon_{//}$, and the short axis dielectric constant of which is $\epsilon_\perp$, wherein $n_\perp$ and $n_{//}$ meet the following relationship: $n_{//} > n_\perp$, $n_{//}$ and $n_P$ meet the following relationship: $n_{//} = n_P$, and $\epsilon_{//}$ and $\epsilon_\perp$ meet the following relationships:

$\Delta\epsilon > 0$ when $f = f_L < f_c$, $\Delta\epsilon < 0$ when $f = f_H > f_c$, and $\Delta\epsilon = 0$ when $f = f_c$, wherein f is the drive frequency of the external drive voltage V(f), $f_L$ is a homeotropic alignment frequency, $f_H$ is a homogeneous alignment frequency, $f_c$ is a cross-over frequency, and $\Delta\epsilon = \epsilon_{//} - \epsilon_\perp$;

when $f = f_L < f_c$, that is, when $\Delta\epsilon > 0$, the electric field generated by the external drive voltage rotates the spatial alignment direction of the liquid crystal molecules so that long axes of the liquid crystal molecules are aligned along the direction of the electric field; when $f = f_H > f_c$, that is, when $\Delta\epsilon < 0$, the electric field generated by the external drive voltage aligns short axes of the liquid crystal molecules along the direction of the electric field; and when $f = f_c$, that is, when $\Delta\epsilon = 0$, the electric field generated by the external drive voltage loses the function of rotating the liquid crystal molecule.

Further, for the homogeneous alignment frequency $f_H$, when the external drive voltage $V(f = f_H)$ with a preset amplitude drives the liquid crystal molecules at a frequency f equal to $f_H$, long axes of the liquid crystal molecules are aligned along a Z-axis direction; for incident light polarized in the Z-axis direction, the effective optical refractive index of the liquid crystal molecule in the crystal liquid droplet meets the following relationship: $n_{eff} = n_{//} = n_P$, and the DFD-PDLC lenticular lens element presents a light penetrated characteristic.

Further, for the homeotropic alignment frequency $f_L$, when the external drive voltage $V(f = f_L)$ with a preset amplitude drives the liquid crystal molecules at a frequency f equal to $f_L$, long axes of the liquid crystal molecules are aligned along a Y-axis direction; for incident light polarized in the Z-axis direction, the effective optical refractive index of the liquid crystal molecule in the crystal liquid droplet meets the following relationship: $n_{eff} = n_\perp < n_P$, and the DFD-PDLC lenticular lens element presents the characteristics of a lens.

Aiming at the foregoing well-known surface relief based liquid crystal lenticular device, the present invention provides a simpler structure for switching between the display of a 2D image and the display of a 3D image. The surface relief based liquid crystal lenticular device formed by filling a plano-concave lens having ITO electrodes with liquid crystal molecules is featured in electric field modulated refractive index, that is, the orientation of the liquid crystal molecules are aligned under the control of an external voltage to change the refractive index of the liquid crystal molecules, thereby providing a light penetration effect or the effect of a lens for linear polarized incident light to finally switch between the display of a 2D image and the display of a 3D image.

In the actual production process, the lower ITO electrode layer and the concave surface of the plano-concave lens need to be individually provided with an alignment film in the surface relief based liquid crystal lenticular device. That is, the foregoing well-known surface relief based liquid crystal lenticular device is manufactured through the conventional liquid crystal process.

The 2D and 3D image switchable display device provided herein includes an image display and a DFD-PDLC Lenticular lens array consisting of a plurality of parallel DFD-PDLC lenticular lens elements each of which is installed in front of the screen of the image display in such a manner that the orientation of the long axis of each DFD-PDLC Lenticular lens element is vertical to or slant to the screen of the image display. The optical refractive index of the DFD-PDLC lenticular lens element is variated under the drive of an external proper voltage to provide the display of a 2D image and a 3D image, thereby achieving the purpose of switching between the display of the 2D image and the 3D image.

The principle of the present invention lies in switching between the display of a 2D image and the display of a 3D image according to a surface relief method and a DFD-PDLC (Dual-Frequency Driven Polymer Dispersed Liquid Crystal) method. Compared with the surface relief based liquid crystal lenticular device and the drive method for the same, the method provided herein for a DFD-PDLC achieves the same lens switching function and the same 2D and 3D image switchable display function with a simpler structure through a simpler process.

BRIEF DESCRIPTION OF THE DRAWINGS

The accompanying drawings constituting a part of the present invention are provided for a better understanding of the present invention, and the exemplary embodiments of the present invention and the description thereof are illustrative of the present invention but are not to be construed as improperly limiting the present invention. In the accompanying drawings.

DETAILED DESCRIPTION OF THE EMBODIMENTS

Embodiments of the present invention are described below in combination with accompanying drawings, however, the present invention may be embodied in a variety of forms limited and covered by appending claims.

Embodiment 1

Figure 1:
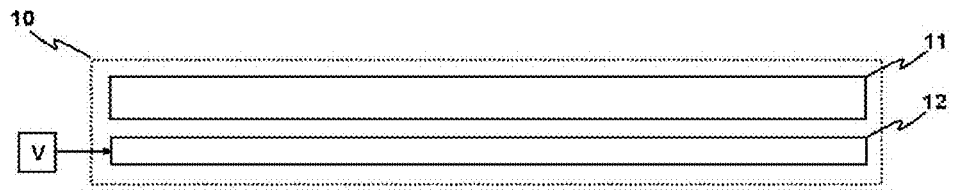
FIG. 1 is a schematic diagram illustrating a 2D and 3D image switchable display device according to the prior art.
Figure 1:
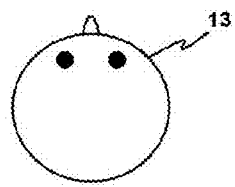
Figure 2:
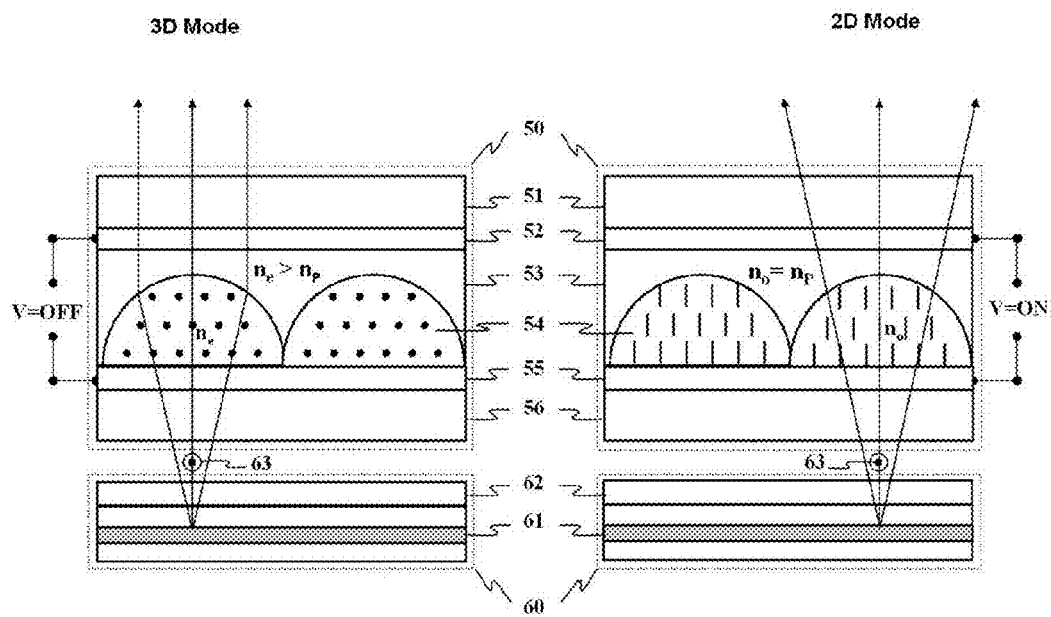
FIG. 2 is a schematic diagram illustrating a surface relief based liquid crystal lenticular device according to the prior art.
Figure 3:
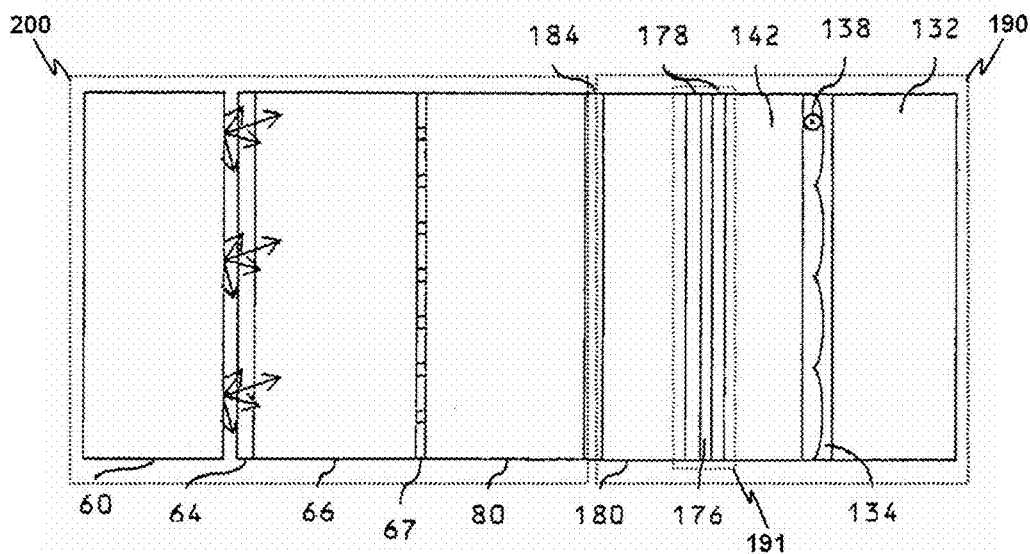
FIG. 3 is a schematic diagram illustrating a polarization activation based liquid crystal lenticular device according to the prior art.
Figure 4:
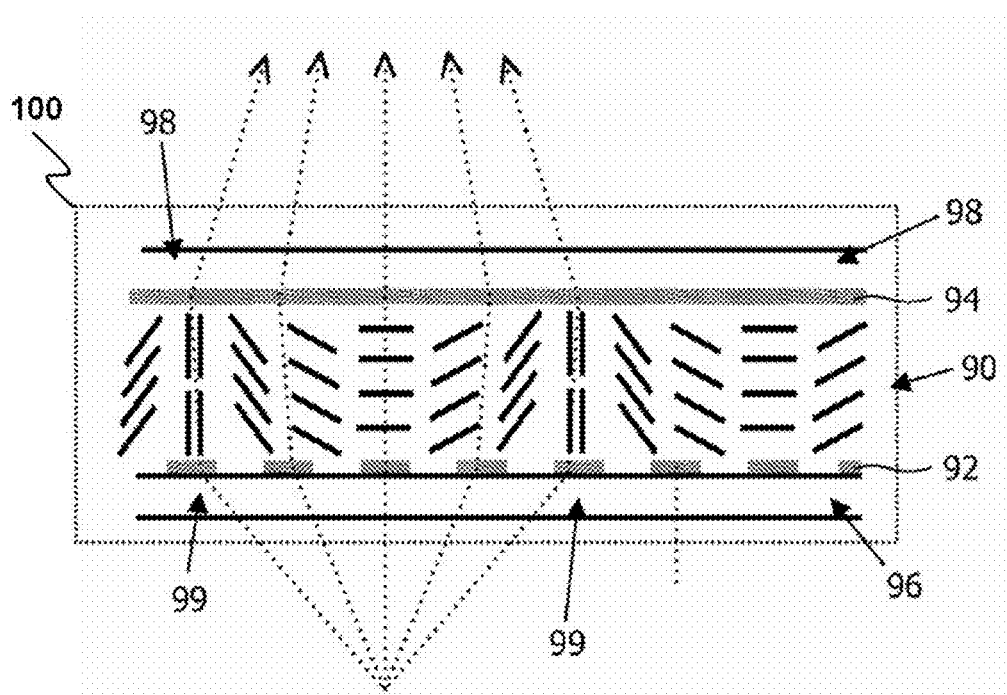
FIG. 4 is a schematic diagram illustrating a patterned-electrode based liquid crystal lenticular device according to the prior art.
Figure 5:
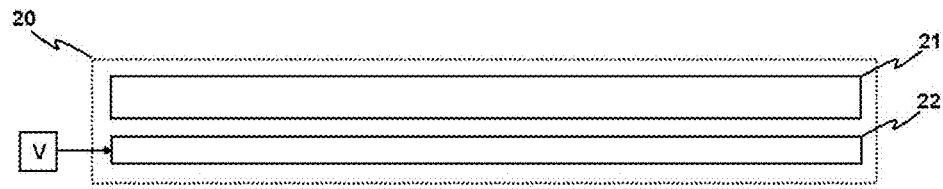
FIG. 5 is a schematic diagram illustrating the structure of a 2D and 3D image switchable display device provided herein according to an embodiment 1 of the present invention.

FIG. 5 is a schematic diagram showing the structure of the 2D and 3D image switchable display device disclosed herein. As shown in FIG. 5, the 2D and 3D image switchable display device 20 is composed of an image display 21 and a DFD-FDLC lenticular lens array 22 including a plurality of parallel DFD-PDLC lenticular lens elements.

The image display screen 21, which may be an regular liquid crystal display, a plasma display, an OLED display or an LED display, including a plurality of sub-pixels of three primary colors R, G and B, the sub-pixels may be in a vertical Strip configuration, a mosaic configuration, a delta configuration or a Pentile configuration to be capable of displaying a 2D image (not shown) consisting of single viewpoints or a 3D image (not shown) synthesized by a plurality of viewpoints. Apparently, the image display screen 21 may also include a field-sequential-color LCD which is a liquid crystal display needing no color light filter. By displaying sub-pictures consisting of red, green and blue LED light sources using a time sequence, the persistence of vision is generated to present a full-color image on the retina of the viewer.

Further, the DFD-FDLC lenticular lens array 22 includes a plurality of parallel DFD-FDLC lenticular lens elements (as shown in FIG. 6-FIG. 12) each of which is installed in front of the display screen 21 in such a manner that the direction of the long axis of each DFD-FDLC lenticular lens element is vertical to or slant to the screen of the image display 21. The optical refractive index of the DFD-FDLC lenticular lens element is variated under the drive of an external proper voltage to switch between the display of the 2D image and the 3D image for the viewer 23.

Figure 6:
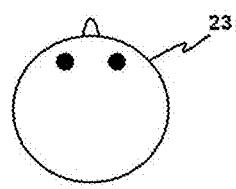
FIG. 6 is a schematic diagram illustrating the structure of a DFD-PDLC lenticular lens array according to an embodiment 1 of the present invention.
Figure 6:
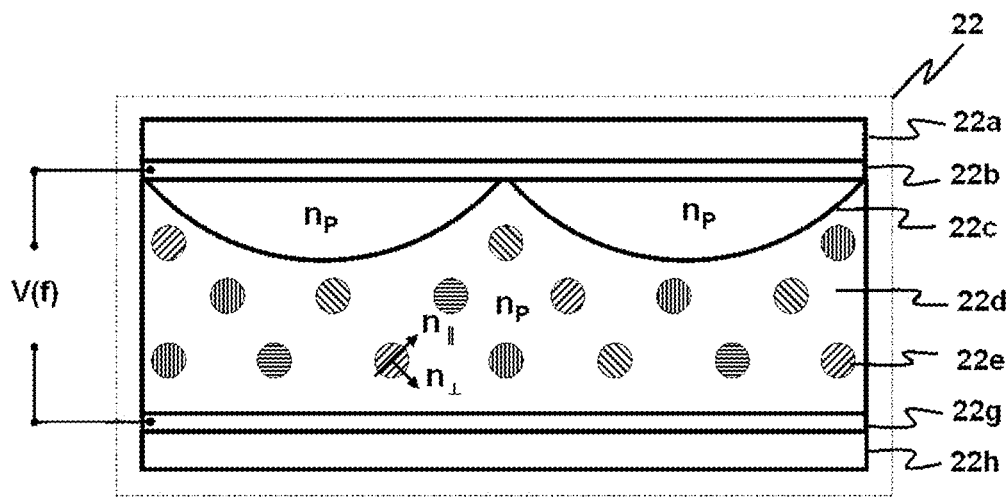

FIG. 6 is a schematic diagram illustrating the structure of a DFD-PDLC lenticular lens array according to an embodiment 1 of the present invention. Each of the DFD-PDLC lenticular lens elements includes, from the top down, an upper transparent substrate 22a, an upper ITO electrode layer 22b, a plano-convex polymer lens 22c, a plano-concave PDLC lens 22D, a lower ITO electrode layer 22g, and a lower transparent substrate 22h.

The upper and the lower transparent substrate 22a and 22h are made from transparent glass or a PET material; the upper and the lower ITO electrode layers 22b and 22g are transparent electrode layers independently installed on internal sides (the sides close to PDLC) of corresponding upper and lower transparent substrates 22a and 22h. Further, the upper and the lower ITO electrode layers 22b and 22g are connected with an external drive voltage V(f) to generate an electric field (not shown) by means of the external drive voltage V(f), wherein f is the drive frequency of the external drive voltage.

The plano-convex polymer lens 22c made from a polymer material has an optical refractive index $n_P$, wherein the convex surface of the plano-convex lens is a spherical surface or a circular surface, depending upon different applications, and the optical structure of the plano-convex polymer lens 22c is formed through a mould stamping shaping process and a UV-cured roll-to-roll manufacturing process. The plano-convex polymer lens, when having a spherical convex surface, corresponds to a micro-lens array, and when having a circular convex surface, corresponds to the DFD-PDLC lenticular lens array disclosed herein.

Further, each plano-concave PDLC lens 22d including a plurality of liquid crystal (LC) droplets 22e and a polymer material 22f is filled inside the plano-concave polymer lens 22D through a coating process. The plurality of LC droplets 22e are uniformly distributed inside the polymer material 22f, and the size of the droplet is greater than or smaller than wavelengths of visible lights.

Figure 7:
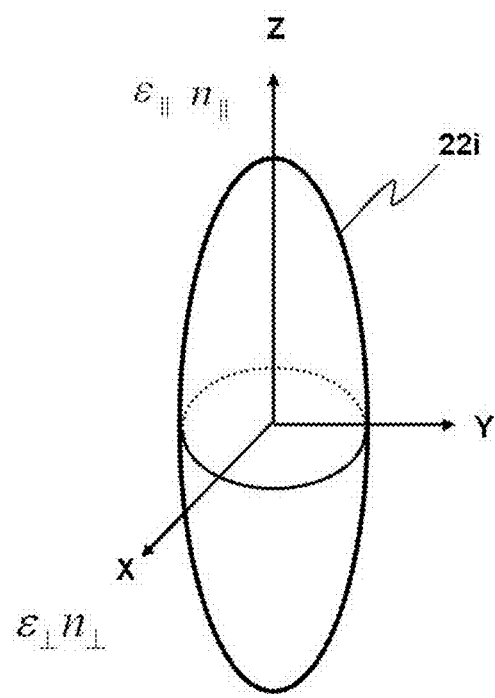
FIG. 7 is a schematic diagram illustrating the structure of a liquid crystal molecule according to the present invention.

Further, each LC droplet 22e includes a plurality of liquid crystal molecules 22i. As shown in FIG. 7, each liquid crystal molecule 22i is a rod-shaped structure having the long axis of which is distributed along a Z-axis and the short axis of which is distributed along an X-Y plane. The optoelectronic effect of the liquid crystal molecule 22*i* is determined by the polarization direction of incident light, an optical reflective index n and a dielectric constant c.

Generally, the optoelectronic effect of liquid crystal molecules depends on the polarization direction of the incident light, the optical reflective index of the liquid crystal molecules and dielectric constant of the liquid crystal molecules. When the polarization direction (not shown) of the incident light is parallel to the long axis direction of the liquid crystal molecules 22*i*, the phase delay of the incident light is determined by the extraordinary optical reflective index $n_{//}$, and when the polarization direction of the incident light is vertical to the long axis direction of the liquid crystal molecules 22*i*, the phase delay of the incident light is determined by the ordinary optical refractive index $n_\perp$. Further, when the liquid crystal molecule is positive uniaxial liquid crystal, $n_{//} > n_\perp$.

Figure 8:
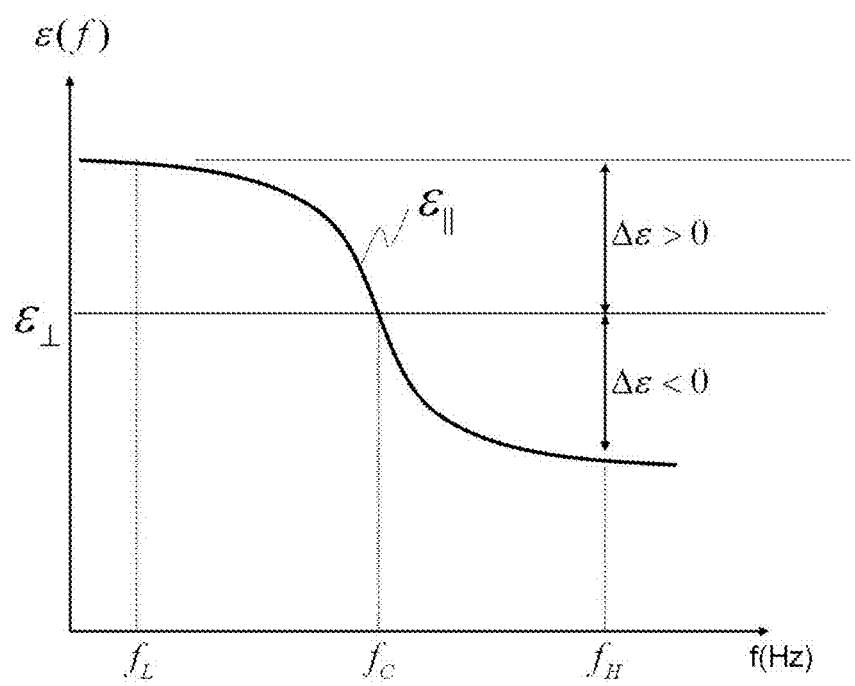
FIG. 8 is a schematic diagram illustrating the frequency dependent dielectric constant of the liquid crystal molecules according to the present invention.

Additionally, the electrical function of the liquid crystal molecules depends on the amplitude and the frequency of the drive voltage as well as the dielectric characteristic of the liquid crystal molecules. FIG. 8 is a schematic diagram illustrating the relation between the frequency dependent dielectric constants $\epsilon_{//}$ and $\epsilon_\perp$ of liquid crystal molecules and the frequency f of the drive voltage. For a drive voltage with a proper amplitude, the long axis dielectric constant $\epsilon_{//}$ of the liquid crystal molecule can be variated by changing the frequency f of the drive voltage without influencing the short axis dielectric constant $\epsilon_\perp$ of liquid crystal molecules. Therefore, for electrical effect, the liquid crystal molecules meet the following relationship:

$$\Delta\epsilon > 0 \text{ when } f = f_L < f_c; \quad (1)$$

$$\Delta\epsilon < 0 \text{ when } f = f_H > f_c; \quad (2)$$

$$\Delta\epsilon = 0 \text{ when } f = f_c; \quad (3)$$

wherein $\Delta\epsilon = \epsilon_{//} - \epsilon_\perp$.

Figure 9:
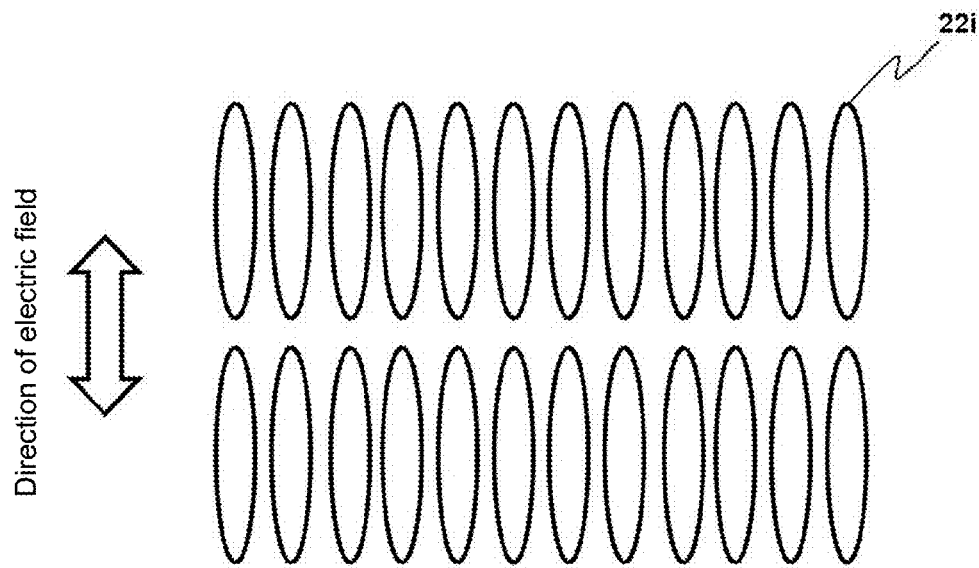
FIG. 9 is a schematic diagram illustrating the homeotropic alignment of the liquid crystal molecules according to the present invention.

FIG. 9 is a schematic diagram illustrating the homeotropic alignment of the liquid crystal molecules. When $f = f_L < f_c$, that is, when $\Delta\epsilon > 0$, the electric field generated by the drive voltage is capable of rotating the orientation of the liquid crystal molecules 22*i* to align long axes of the liquid crystal molecules 22*i* along the direction of the electric field, and $f_L$ is referred to as a homeotropic alignment frequency.

Figure 10:
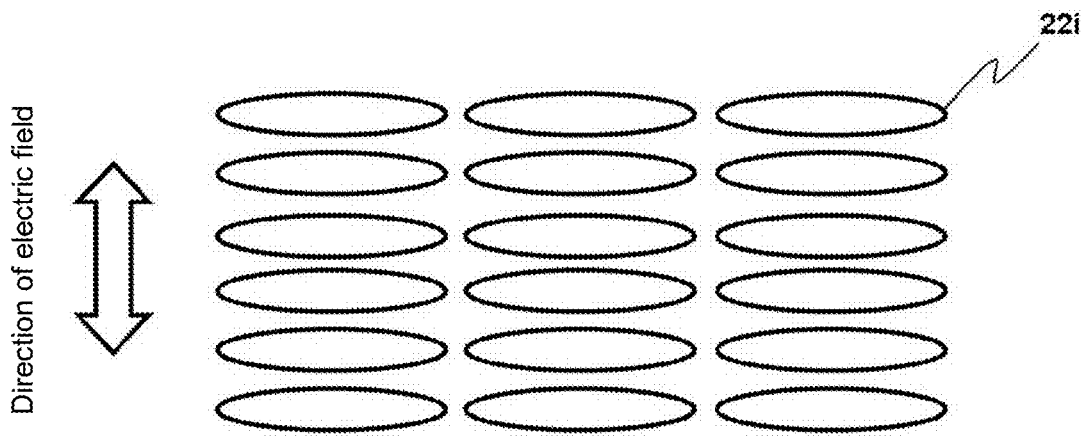
FIG. 10 is a schematic diagram illustrating the homogeneous alignment of the liquid crystal molecules according to the present invention.

When $\Delta\epsilon$ is smaller than 0, short axes of the liquid crystal molecules 22*i* are aligned along the direction of the electric field, as shown in FIG. 10, under the effect of the drive voltage, and $f_H$ is referred to as a homogeneous alignment frequency.

When $\Delta\epsilon = 0$, the drive voltage loses the function of rotating the liquid crystal molecules 22*i*, and $f_c$ is referred to as a cross-over frequency.

By means of the optoelectronic effect of the liquid crystal molecules, the DFD-PDLC lenticular lens array may realize the switchable display of a 2D image and a 3D image, as shown in FIG. 6, when the optical refractive index $n_P$ of the polymer material and the extraordinary optical refractive index $n_{//}$ of the liquid crystal molecules meet the following relationship: $n_P = n_{//}$.

Figure 11:
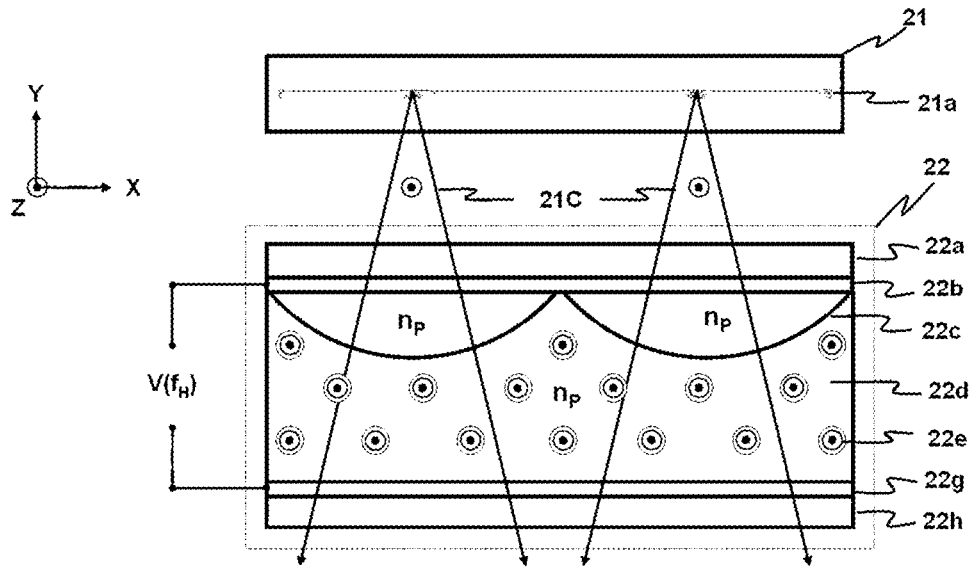
FIG. 11 is a schematic diagram illustrating the optoelectronic function of a DFD-PDLC lenticular lens array in a 2D mode according to an embodiment 1 of the present invention.

FIG. 11 is a schematic diagram illustrating the optoelectronic effect of the DFD-PDLC lenticular lens array in a 2D mode according to an embodiment 1 of the present invention. Further, when the external drive voltage $V(f=f_H)$ with a proper amplitude drives the liquid crystal molecules at a frequency f equal to $f_H$, long axes of the liquid crystal molecules are aligned along a Z-axis direction; for incident light 21*c* polarized in the Z-axis direction, the effective optical refractive index of the liquid crystal molecules in the crystal liquid droplet 22*e* meets the following relationship: $n_{eff} = n_{//} = n_P$, and the DFD-PDLC lenticular lens element array 22 presents a light penetrated characteristic. Thus, the 2D image 21*a* displayed on the screen of the image display 21 may be presented.

Figure 12:
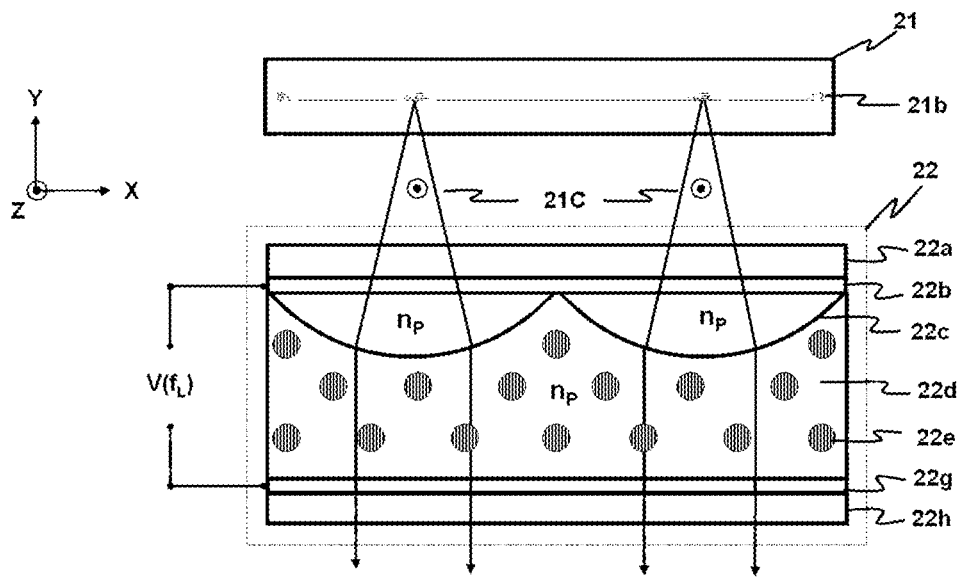
FIG. 12 is a schematic diagram illustrating the optoelectronic function of a DFD-PDLC lenticular lens array in a 3D mode according to an embodiment 1 of the present invention.

FIG. 12 is a schematic diagram illustrating the optoelectronic effect of the DFD-PDLC lenticular lens array in a 3D mode according to an embodiment 1 of the present invention. Further, when the external drive voltage $V(f=f_L)$ with a proper amplitude drives the liquid crystal molecules at a frequency f equal to $f_L$, long axes of the liquid crystal molecules are aligned along a Y-axis direction; for incident light 21*c* polarized in the Z-axis direction, the effective optical refractive index of the liquid crystal molecules in the crystal liquid droplet 22*e* meets the following relationship: $n_{eff} = n_\perp < n_P$, and the DFD-PDLC lenticular lens array 22 presents the characteristics of a lens. Thus, the 3D image 21*b* displayed on the screen of the image display 21 may be presented.

Embodiment 2

Figure 13:
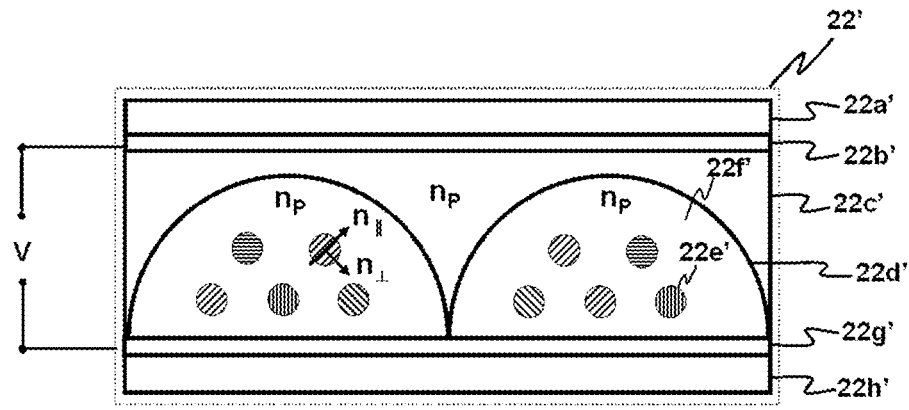
FIG. 13 is a schematic diagram illustrating the structure of a DFD-PDLC lenticular lens array according to an embodiment 2 of the present invention.

FIG. 13 is a schematic diagram illustrating the structure of a DFD-PDLC lenticular lens array according to an embodiment 2 of the present invention. Each of the DFD-PDLC lenticular lens includes, from the top down, an upper transparent substrate 22*a*', an upper ITO electrode layer 22*b*', a plano-concave polymer lens 22*c*', a plano-convex PDLC lens 22*d*', a lower ITO electrode layer 22*g*', and a lower transparent substrate 22*h*'.

The upper and the lower transparent substrates 22*a*' and 22*h*' are made from transparent glass or a PET material; the upper and the lower ITO electrode layers 22*b*' and 22*g*' are transparent electrode layers independently installed on internal sides (the sides close to PDLC) of corresponding upper and lower transparent substrates 22*a*' and 22*h*'. Further, the upper and the lower ITO electrode layers 22*b*' and 22*g*' are connected with an external drive voltage V(f) to generate an electric field (not shown) by means of the external drive voltage V(f), wherein f is the drive frequency of the external drive voltage.

The plano-concave polymer lens 22*c*' made from a polymer material has an optical refractive index $n_P$, wherein $n_P = n_\perp$. The concave surface of the plano-concave polymer lens may be a spherical surface or a circular surface, depending upon different applications, and the optical structure of the plano-concave polymer lens is formed through a mould stamping shaping process and a UV-cured roll-to-roll manufacturing process. The plano-concave polymer lens, when having a spherical concave surface, corresponds to a micro-lens array, and when having a circular concave surface, corresponds to the DFD-PDLC lenticular lens array disclosed herein.

Further, each plano-convex PDLC lens 22*d*' including a plurality of LC droplets 22*e*' and polymer material 22*f* is filled inside the plano-convex polymer lens 22*d*' through a coating process. The plurality of LC droplets 22*e*' are uniformly distributed inside the polymer material 22*f*, and the size of the droplet is greater than or smaller than wavelengths of visible lights.

Figure 14:
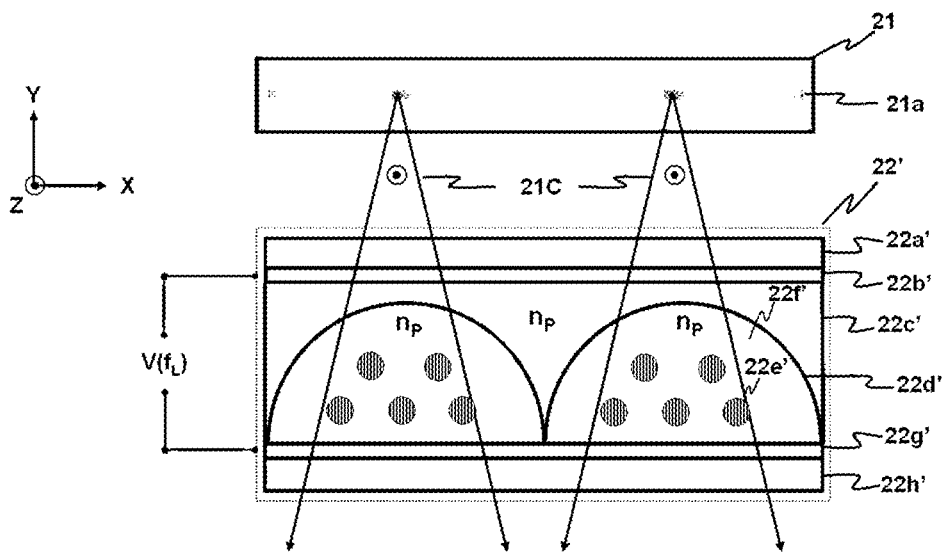
FIG. 14 is a schematic diagram illustrating the optoelectronic function of a DFD-PDLC lenticular lens array in a 2D mode according to an embodiment 2 of the present invention.

FIG. 14 is a schematic diagram illustrating the optoelectronic effect of the DFD-PDLC lenticular lens array in a 2D mode according to an embodiment 2 of the present invention. Further, when the external drive voltage $V(f=f_L)$ with a proper amplitude drives the liquid crystal molecules at a frequency f equal to $f_L$, long axes of the liquid crystal molecules are aligned along a Y-axis direction; for incident light 21*c* polarized in the Z-axis direction, the effective optical refractive index of the liquid crystal molecules in the crystal liquid droplet 22e' meets the following relationship: $n_{eff}=n_\perp=n_P$, and the DFD-PDLC lenticular lens array 22' presents a light penetrated characteristic. Thus, the 2D image 21a displayed on the screen of the image display 21 may be presented.

Figure 15:
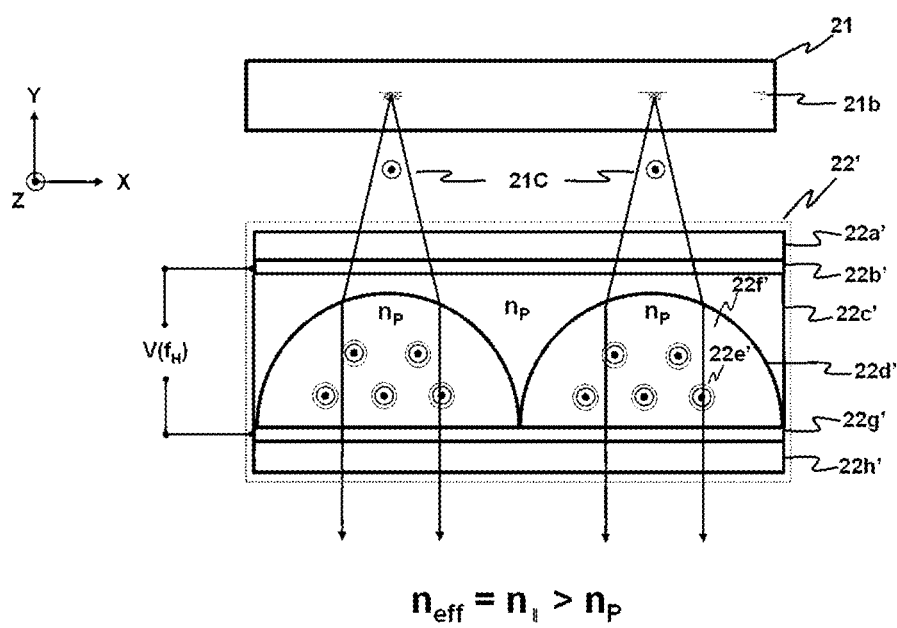
FIG. 15 is a schematic diagram illustrating the optoelectronic function of a DFD-PDLC lenticular lens array in a 3D mode according to an embodiment 2 of the present invention.

FIG. 15 is a schematic diagram illustrating the optoelectronic effect of the DFD-PDLC lenticular lens array in a 3D mode according to an embodiment 3 of the present invention. Further, when the external drive voltage $V(f=f_H)$ with a proper amplitude drives the liquid crystal molecules at a frequency f equal to $f_H$, long axes of the liquid crystal molecules are aligned along a Z-axis direction; for incident light 21c polarized in the Z-axis direction, the effective optical refractive index of the liquid crystal molecules in the crystal liquid droplet 22e' meets the following relationship: $n_{eff}=n_{//}>n_P$, and the DFD-PDLC lenticular lens array 22' presents the characteristics of a lens. Thus, the 3D image 21c displayed on the screen of the image display 21 may be presented.

The mentioned above is merely preferred embodiments of the present invention but not limitation to the invention, it should be appreciated that various modification and variations may be devised by those of ordinary skill in the art. Any modification, equivalent or improvement devised without departing from the spirit and scope of the present invention should fall within the protection range of the present invention.

The invention claimed is:

1. A 2D and 3D image switchable display device, comprising:
   an image display the screen of which comprises a plurality of sub-pixels of three primary colors R, G and B for displaying a 2D image and a 3D image; and
   a dual-frequency driven polymer dispersed liquid crystal (DFD-PDLC) lenticular lens array which comprises a plurality of parallel DFD-PDLC lenticular lens elements, wherein a direction of a long axis of each DFD-PDLC lenticular lens element is vertical or slant to a screen of the image display, the DFD-PDLC lenticular lens array is installed in front of the screen of the image display, and the optical refractive index of the DFD-PDLC lenticular lens elements is variated under the drive of an external drive voltage V(f) to switch between the display of a 2D image and the display of a 3D image on the screen of the image display, wherein f is the drive frequency of the external drive voltage.

2. The 2D and 3D image switchable display device according to claim 1, wherein the image display is selected from a liquid crystal display, a plasma display, an OLED display, and an LED display, and the configuration of the sub-pixels of the screen of the image display is selected from: a vertical strip configuration, a mosaic configuration, a delta configuration and a pentile configuration.

3. The 2D and 3D image switchable display device according to claim 1, wherein each DFD-PDLC lenticular lens element comprises, from the top down, an upper transparent substrate, an upper ITO electrode layer, a plano-convex polymer lens, a plano-concave PDLC lens, a lower ITO electrode layer and a lower transparent substrate.

4. The 2D and 3D image switchable display device according to claim 3, wherein the material of the upper transparent substrate and the lower transparent substrate is transparent glass or PET material.

5. The 2D and 3D image switchable display device according to claim 3, wherein the upper ITO electrode layer and the lower ITO electrode layer are transparent electrode layers installed on internal sides of corresponding transparent substrates and connected with the external drive voltage V(f) to generate an electric field by means of the external drive voltage V(f).

6. The 2D and 3D image switchable display device according to claim 3, wherein the plano-convex polymer lens made from polymer material has an optical refractive index $n_P$, wherein a convex surface of the plano-convex polymer lens is an arc surface, and the optical structure of the plano-convex polymer lens is formed through a mould stamping shaping process and a UV-cured roll-to-roll manufacturing process.

7. The 2D and 3D image switchable display device according to claim 3, wherein the plano-concave PDLC lens consisting of a plurality of liquid crystal droplets and polymer material, wherein the polymer material has an optical refractive index $n_P$ and the plurality of liquid crystal droplets are uniformly distributed inside the polymer material, and the plurality of liquid crystal droplets and the polymer material are filled inside the plano-concave PDLC lens through a coating process.

8. The 2D and 3D image switchable display device according to claim 7, wherein the size of the liquid crystal droplet is greater than wavelengths of visible lights.

9. The 2D and 3D image switchable display device device according to claim 7, wherein the size of the liquid crystal droplet is smaller than wavelengths of visible lights.

10. The 2D and 3D image switchable display device according to claim 7, wherein the liquid crystal droplet consists of a plurality of rod-shaped liquid crystal molecules having the ordinary refractive index of which is $n_\perp$, the extraordinary refractive index of which is $n_\|$, the long axis dielectric constant of which is $\epsilon_\|$, and the short axis dielectric constant of which is $\epsilon_\perp$, wherein $n_\perp$ and $n_\|$ meet the following relationship: $n_\|>n_\perp$, $n_\|$ and $n_P$ meet the following relationship: $n_{//}=n_P$, and $\epsilon_\|$ and $\epsilon_\perp$ meet the following relationships:

$\Delta\epsilon>0$ when $f=f_L<f_c$;

$\Delta\epsilon<0$ when $f=f_H>f_c$;

$\epsilon\Delta=0$ when $f=f_c$;

wherein f is the drive frequency of the external drive voltage V(f), $f_L$ is a homeotropic alignment frequency, $f_H$ is a homogeneous alignment frequency, $f_c$ is a cross-over frequency, and $\Delta\epsilon=\epsilon_\|-\epsilon_\perp$;
    when $f=f_L<f_c$, that is, when $\Delta\epsilon>0$, the electric field generated by the external drive voltage rotates the orientation of the liquid crystal molecules so that long axes of the liquid crystal molecules are aligned along the direction of the electric field; when $f=f_H>f_c$, that is, when $\Delta\epsilon<0$, the electric field generated by the external drive voltage aligns short axes of the liquid crystal molecules along the direction of the electric field; and when $f=f_c$, that is, when $\Delta\epsilon=0$, the electric field generated by the external drive voltage loses the function of rotating the liquid crystal molecules.

11. The 2D and 3D image switchable display device according to claim 10, wherein for the homogeneous alignment frequency $f_H$, when the external drive voltage $V(f=f_H)$ with a preset amplitude drives the liquid crystal molecules at a frequency f equal to $f_H$, long axes of the liquid crystal molecules are aligned along a Z-axis direction; for incident light polarized in the Z-axis direction, the effective optical refractive index of the liquid crystal molecules in the crystal liquid droplet meets the following relationship: $n_{eff}=n_{//}=n_P$, and the DFD-PDLC lenticular lens element presents a light penetrated characteristic.

12. The 2D and 3D image switchable display device according to claim 10, wherein for the homeotropic alignment frequency $f_L$, when the external drive voltage $V(f=f_L)$ with a preset amplitude drives the liquid crystal molecules at a frequency f equal to $f_L$, long axes of the liquid crystal molecules are aligned along a Y-axis direction; for incident light polarized in the Z-axis direction, the effective optical refractive index of the liquid crystal molecules in the crystal liquid droplet meets the following relationship: $n_{eff}=n_\perp<n_P$, and the DFD-PDLC lenticular lens element presents the characteristics of a lens.

13. The 2D and 3D image switchable display device according to claim 1, wherein each DFD-PDLC lenticular lens element comprises, from the top down, an upper transparent substrate, an upper ITO electrode layer, a plano-concave polymer lens, a plano-convex PDLC lens, a lower ITO electrode layer and a lower transparent substrate.

14. The 2D and 3D image switchable display device according to claim 13, wherein the material of the upper transparent substrate and the lower transparent substrate is transparent glass or PET material.

15. The 2D and 3D image switchable display device according to claim 13, wherein the upper ITO electrode layer and the lower ITO electrode layer are transparent electrode layers installed on internal sides of corresponding transparent substrates and connected with the external drive voltage V(f) to generate an electric field by means of the external drive voltage V(f).

16. The 2D and 3D image switchable display device according to claim 13, wherein the plano-concave polymer lens made from polymer material has an optical reflective index $n_P$, wherein a concave surface of the plano-concave polymer lens is an arc surface, and the optical structure of the plano-concave polymer lens is formed through a mould stamping shaping process and a UV-cured roll-to-roll manufacturing process.

17. The 2D and 3D image switchable display device according to claim 13, wherein plano-convex PDLC lens consisting of a plurality of liquid crystal droplets and polymer material, wherein the polymer material has an optical refractive index $n_P$ and the plurality of liquid crystal droplets are uniformly distributed inside the polymer material, and the plurality of liquid crystal droplets and the polymer material are filled inside the plano-convex PDLC lens through a coating process.

18. The 2D and 3D image switchable display device according to claim 17, wherein the size of the liquid crystal droplet is greater than wavelengths of visible lights.

19. The 2D and 3D image switchable display device according to claim 17, wherein the size of the liquid crystal droplet is smaller than wavelengths of visible lights.

20. The 2D and 3D image switchable display device according to claim 17, wherein the liquid crystal droplet consists of a plurality of rod-shaped liquid crystal molecules having the ordinary refractive index of which is $n_\perp$, the extraordinary refractive index of which is $n_\parallel$, the long axis dielectric constant of which is $\epsilon_\parallel$, and the short axis dielectric constant of which is $\epsilon_\perp$, wherein $n_\perp$ and $n_\parallel$ meet the following relationship: $n_{//}>n_\perp$, $n_\perp$ and $n_P$ meet the following relationship: $n_\perp=n_P$, and $\epsilon_\parallel$ and $\epsilon_\perp$ meet the following relationships:

$\Delta\epsilon>0$ when $f=f_L<f_c$, $\Delta\epsilon<0$ when $f=f_H>f_c$, and $\Delta\epsilon=0$ when $f=f_c$, wherein f is the drive frequency of the external drive voltage V(f), $f_L$ is a homeotropic alignment frequency, $f_H$ is a homogeneous alignment frequency, $f_c$ is a cross-over frequency, and $\Delta\epsilon=\epsilon_\parallel-\epsilon_\perp$;

when $f=f_L<f_c$, that is, when $\Delta\epsilon>0$, the electric field generated by the external drive voltage is capable of rotating the orientation of the liquid crystal molecules so that long axes of the liquid crystal molecules are aligned along the direction of the electric field; when $f=f_H>f_c$, that is, when $\Delta\epsilon<0$, the electric field generated by the external drive voltage aligns short axes of the liquid crystal molecules along the direction of the electric field; and when $f=f_c$, that is, when $\Delta\epsilon=0$, the electric field generated by the external drive voltage loses the function of rotating the liquid crystal molecule.

21. The 2D and 3D image switchable display device according to claim 20, wherein for the homeotropic alignment frequency $f_L$, when the external drive voltage $V(f=f_L)$ with a preset amplitude drives the liquid crystal molecules at a frequency f equal to $f_L$, long axes of the liquid crystal molecules are aligned along a Y-axis direction; for incident light polarized in the Z-axis direction, the effective optical refractive index of the liquid crystal molecule in the crystal liquid droplet meets the following relationship: $n_{eff}=n_\perp=n_P$, and the DFD-PDLC lenticular lens element presents a light penetrated characteristic.

22. The 2D and 3D image switchable display device according to claim 20, wherein for the homogeneous alignment frequency $f_H$, when the external drive voltage $V(f=f_H)$ with a preset amplitude drives the liquid crystal molecules at a frequency f equal to $f_H$, long axes of the liquid crystal molecules are aligned along a Z-axis direction; for incident light polarized in the Z-axis direction, the effective optical refractive index of the liquid crystal molecule in the crystal liquid droplet meets the following relationship: $n_{eff}=n_{//}>n_P$, and the DFD-PDLC lenticular lens element presents the characteristics of a lens.

23. The 2D and 3D image switchable display device according to claim 1, wherein the image display is a field-sequential-color liquid crystal display.

24. A DFD-PDLC lenticular lens element, comprising: from the top down, an upper transparent substrate, an upper ITO electrode layer, a plano-convex polymer lens, a plano-concave PDLC lens, a lower ITO electrode layer and a lower transparent substrate, wherein the optical refractive index of the DFD-PDLC lenticular lens element is variated under the drive of an external drive voltage V(f), wherein f is the drive frequency of the external drive voltage.

* * * * *